L. J. WICKS.
Corn Sheller.
No. 21,288.
Patented Aug. 24, 1858.
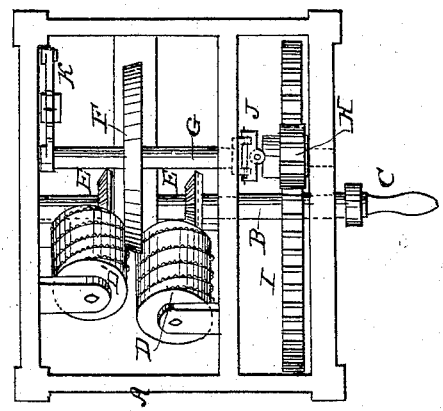
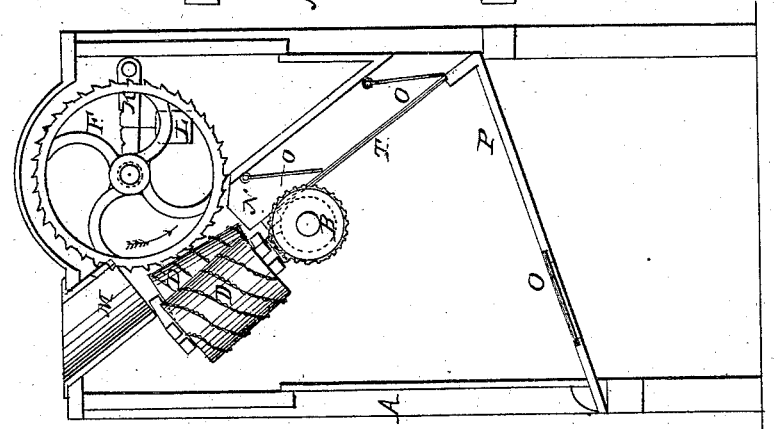
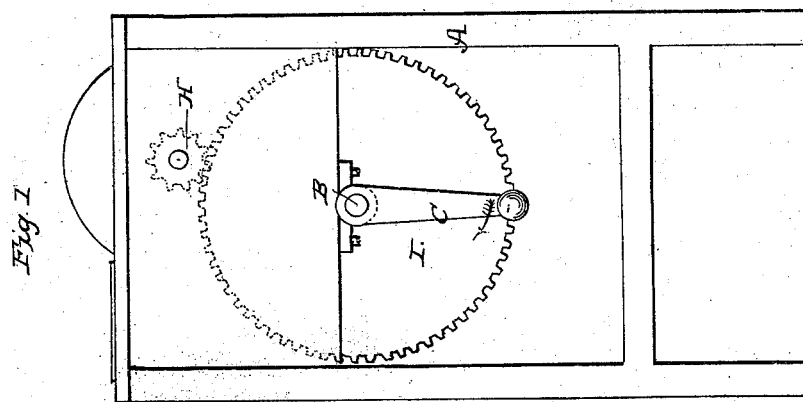

UNITED STATES PATENT OFFICE.

L. J. WICKS, OF RACINE, WISCONSIN.

CORN-SHELLING MACHINE.

Specification of Letters Patent No. 21,288, dated August 24, 1858.

*To all whom it may concern:*

Be it known that I, LOREN J. WICKS, of Racine, in the county of Racine and State of Wisconsin, have invented certain new and useful Improvements in Machines for Shelling Corn; and I do hereby declare that the following is a full and exact description of the construction and operation of the same, reference being had to the accompanying drawings, and to the letters of reference marked thereon, in which—

Figure 1 is a side elevation, Fig. 2 is a vertical section and Fig. 3 a plan view of the machine.

A is the frame or case of the machine, made of wood or iron, as may be preferred, and of a height so that the machine can be readily operated by hand.

B is the main, or driving shaft, working in suitable boxes upon the frame A, and having a crank C by which it may be operated by hand; or if required the crank may be removed and a pulley or gear wheel be put in its place and the machine be operated by power.

D, D′ are two cylinders having rows of spiral serrated teeth upon their peripheries, upon and by which the ears are rotated and projected downward while they are being shelled of their corn by the shelling wheel. They are set at about the angles to a vertical line shown in the drawings—the rear one being set at a more acute angle than the front one for the purpose of retaining the ear of corn in contact with the shelling wheel and to prevent its being thrown off sidewise by the rotation of the cylinders, as it would be if the cylinders were placed in line with each other or at the same angle. The cylinders are rotated in the same direction by bevel pinions upon the lower end of their shafts gearing into the bevel wheels E, E′ upon the driving shaft B.

F is the shelling wheel placed upon the shaft G and driven by the pinion H and spur wheel I. Its periphery is formed at a slight angle to its axle for the purpose of pressing the ear of corn against the rear cylinder D′, and it has hooked teeth upon it which catch against the kernels of corn upon the ear and remove them from the cob. The shaft G is connected to the shaft upon which the pinion H is placed by the universal joint J, and is sustained at its farther end in a box or aperture in the end of the lever K to allow the shelling wheel to adjust itself to contact with different sized or unequal shaped ears of corn. The lever K is suspended by a pin or bolt, upon which it can vibrate, and has the weight L placed upon it to create a proper degree of pressure upon the shelling wheel to cause that wheel to perform its functions.

M is the tube through which the ears of corn to be shelled are fed to the machine.

N is a tube through which the cob is carried after it has been stripped of its corn. It has two flap valves O, O′—opening outwardly—which restrains the corn, that may be carried into it, from following the cob to the outside of the machine, but forces it to the bottom of the tube to be dropped through the grating T, placed between the two valves, to and upon the apron P.

P is an apron upon which the corn falling from between the cylinders D, D′ as well as that carried into the tube N falls to be delivered to the outside of the machine. It has a screen Q placed near its lower end, by, and through which the chaff is separated from the shelled corn in passing over it.

The operation of the machine is as follows—The shaft B being revolved in the direction of the arrow causes the cylinders D, D′ to turn in the same direction with each other, and the shelling wheel F to turn in the direction shown. An ear of corn being introduced through the tube M it falls upon the serrated teeth of the cylinders D, D′ and is by them rotated at the same time that it is projected downward by their spiral inclination. The shelling wheel F is kept in contact with the corn on the ear by the weight L on the lever K—the universal joint J allowing the shaft G to operate at any necessary deviation from a right line in which it may be placed by a variation in the size or shape of the ear of corn—and strips it of its corn by the teeth on its periphery coming in contact with the corn. The larger portion of the corn, as it is shelled from the ear, falls directly upon the apron P, and passing over the screen Q to clear it from chaff, is delivered at the end of the apron at the outside of the machine into a proper receptacle or upon the floor. Such portion of the corn as may be carried into the tube N is prevented from being thrown out through the tube with the cob by the flap valves O, O′, the first of which deflects it to the bottom of the tube and the last forces it to fall through the grating T on the apron P to be delivered with the corn before named. The cob is carried into the tube N by the action of the spiral teeth upon the cylinders D, D', and falls by its own weight through the tube, past the valves O, O', to the outside of the machine.

Having thus explained the construction and operation of my improvements, what I claim as my invention and desire to secure by Letters Patent is—

The employment of the screen Q in the apron P, in connection with the tube N, provided with valves O and O', and grating T, when these several parts are constructed and arranged with respect to each other, and to the shelling wheel F and cylinders D and D', and operate conjointly therewith, in the manner, and for the purpose specified.

LOREN J. WICKS.

Witnesses:
GEO. B. SEANY,
FRANCIS S. LOW.